US009189646B2

(12) United States Patent
Hugosson et al.

(10) Patent No.: US 9,189,646 B2
(45) Date of Patent: Nov. 17, 2015

(54) PROTECTION CIRCUITRY AND METHOD FOR CONTROLLING ACCESS BY PLURAL PROCESSES TO A MEMORY

(71) Applicant: ARM LIMITED, Cambridge (GB)

(72) Inventors: Ola Hugosson, Lund (SE); Erik Persson, Lund (SE); Dominic Hugo Symes, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/173,418

(22) Filed: Feb. 5, 2014

(65) Prior Publication Data
US 2014/0283117 A1 Sep. 18, 2014

(30) Foreign Application Priority Data

Mar. 13, 2013 (GB) .................................. 1304518.2

(51) Int. Cl.
G06F 21/00 (2013.01)
G06F 21/62 (2013.01)
(52) U.S. Cl.
CPC .................................. G06F 21/6218 (2013.01)
(58) Field of Classification Search
CPC .................................................. G06F 21/6218
See application file for complete search history.

(56) References Cited

U.S. PATENT DOCUMENTS 5,469,566 A * 11/1995 Hohenstein et al. ............ 714/6.1
2001/0052054 A1* 12/2001 Franke et al. ................. 711/147
2003/0018860 A1* 1/2003 Krueger ......................... 711/152
2005/0030824 A1* 2/2005 Kreuchauf et al. ........... 365/232
2005/0071697 A1* 3/2005 Batchelor et al. ............. 713/300
2005/0114616 A1* 5/2005 Tune et al. ..................... 711/163
2008/0109588 A1* 5/2008 Yun et al. ....................... 711/103
2008/0162864 A1* 7/2008 Sugumar et al. .............. 711/173
2008/0168308 A1* 7/2008 Eberbach et al. ............... 714/26
2009/0113141 A1* 4/2009 Bullman et al. .............. 711/147
2009/0320048 A1* 12/2009 Watt et al. ..................... 719/319
2010/0223438 A1* 9/2010 Vermeulen et al. ........... 711/163
2012/0084517 A1* 4/2012 Post et al. ..................... 711/153
2012/0265925 A1* 10/2012 Miura ........................... 711/103
2012/0331240 A1* 12/2012 Sauermann et al. .......... 711/148
2014/0032818 A1* 1/2014 Chang et al. .................. 711/103

OTHER PUBLICATIONS

Search Report for GB 1304518.2 dated Sep. 24, 2013.

* cited by examiner

Primary Examiner — Morshed Mehedi
(74) Attorney, Agent, or Firm — Nixon & Vanderhye P.C.

(57) ABSTRACT

A data processing apparatus is provided, comprising plural processing units configured to execute plural processes, a storage unit configured to store data required for the plural processes; and a protection unit configured to control access by the plural processes to the storage unit. The protection unit is configured to define an allocated access region of the storage unit for each process of the plural processes, wherein the protection unit is configured to deny access for each the process outside the allocated access region and wherein allocated access regions are defined to be non-overlapping. The protection unit is configured to define each allocated access region as a contiguous portion of the storage unit between a lower region limit and an upper region limit, and the protection unit is configured such that when the lower region limit is modified the lower region limit cannot be decreased and such that when the upper region limit is modified the upper region limit cannot be decreased.

21 Claims, 9 Drawing Sheets $B = fn(A)$

PROTECTION CIRCUITY AND METHOD FOR CONTROLLING ACCESS BY PLURAL PROCESSES TO A MEMORY

BACKGROUND

This application claims priority to GB Patent Application No. 1304518.2 filed Mar. 13, 2013, the entire content of which is hereby incorporated by reference.

The present invention relates to a data processing apparatus having plural processing units configured to execute plural processes and a storage unit configured to store data for those plural processes. More particularly the present invention relates to a protection unit configured to control access by those plural processes to the storage unit.

It is known to provide a data processing apparatus having multiple processing units which are configured to execute the data processing tasks of the data processing apparatus. The advantages brought by this kind of parallelism are well recognised. Furthermore, it is known to provide storage unit which is configured to store data required for the data processing tasks carried out by the processing units, for example being provided in the format of a local buffer because of the rapid access associated therewith. Accordingly, when a process being executed by the data processing apparatus is shared between more than one processing unit, the need for those processing units to have access to the same data (as part of executing the same process) is facilitated by the shared access to the storage unit.

However, whilst the sharing of data between multiple processing units executing the same process is of general benefit, in the situation where the data processing apparatus is executing multiple processes, it may be necessary to ensure that data stored in the storage unit for one process is not accessible to another process being executed by the data processing apparatus. More specifically, in the context of the data processing apparatus having multiple processing units configured to execute multiple processes, it may be necessary to ensure that a given processing unit is only able to access data stored in the storage unit which is associated with the process which that processing unit is executing (possibly shared with other processing units that are also executing that process).

Hence, in order to ensure the isolation of data between multiple processes being executed on the data processing apparatus, one approach would be to ensure that different processes are not allowed to run concurrently, however this would remove the well known parallelism advantages mentioned above. Alternatively, a storage unit could be provided for each process being executed in the data processing apparatus, but this is typically expensive both in terms of the needs to provide multiple storage units and the increased bandwidth requirement to support them. Aside from such physical constraints, a further approach could be to rely on the multiple processes themselves to be well behaved in their access to stored data, but such an approach typically represents a significant security vulnerability and is generally not desirable.

Accordingly, it would be desirable to provide a technique which enabled multiple processing units executing multiple processes in a data processing apparatus to share access to a storage unit, wherein the isolation of data between different processes being executed is assured.

SUMMARY

Viewed from a first aspect, the present invention provides a data processing apparatus comprising:

plural processing units configured to execute plural processes;

a storage unit configured to store data required for said plural processes; and a protection unit configured to control access by said plural processes to said storage unit, wherein said protection unit is configured to define an allocated access region of said storage unit for each process of said plural processes, wherein said protection unit is configured to deny access for each said process outside said allocated access region and wherein allocated access regions are defined to be non-overlapping, wherein said protection unit is configured to define each said allocated access region as a contiguous portion of said storage unit between a lower region limit and an upper region limit, and wherein said protection unit is configured such that when said lower region limit is modified said lower region limit cannot be decreased and such that when said upper region limit is modified said upper region limit cannot be decreased.

The present invention recognises that a hardware-based approach to controlling access by the plural processes to the storage unit is preferable, because of the greater degree of security which this provides. Accordingly, a protection unit is provided within the data processing apparatus which is configured to control access by the plural processes to the storage unit. Furthermore, the present technique recognises that such a protection unit may be configured in an advantageously simple manner, depending on the nature of the data to be stored in the storage unit and the processes being executed. For example, where the stored data is processed in an essentially sequential manner by its associated process, a relatively simple (and therefore more secure) mechanism to define which regions of the storage unit each process can access can be implemented. Thus, according to the present technique, the protection unit defines an allocated access region for a given process as a contiguous portion of the storage unit between a lower region limit and an upper region limit. Furthermore, the protection unit is configured such that when either the lower region limit or the upper region limit is modified, they can only be moved to greater values and cannot be decreased. Thus, in effect, each process is given access to a sliding window within the storage unit which, in the example of the stored data being processed in an essentially sequential manner, corresponds well to the likely usage of the data in the storage unit by the process. Furthermore, by restricting the process to have access to a region of the storage unit above a lower region limit, wherein that lower region limit when modified can only be moved upwards, means that the portion of the storage unit made available by the increasing lower region limit can be allocated to a different process. Thus, despite the fact that two different processes are sharing the same storage unit, and simultaneous updating of the respective allocated access regions of the storage unit for each of those processes may be required (to ensure that maximum usage of the storage unit is made), this can be carried out in an efficient and crucially reliable manner by the hardware.

In some embodiments said protection unit is configured to allow a process of said plural processes to increase said lower region limit. Whilst the reliability of the present technique is based in the fact that a hardware component, namely the protection unit, is responsible for controlling access by the plural processes to the storage unit, given that increasing the lower region limit of an allocated access region can only reduce the portion of the storage unit to which that process has access, the process itself may be allowed to increase the lower region limit without this representing a security vulnerability.

In some embodiments, said process is configured to increase said lower region limit when data stored adjacent to said lower region limit is no longer required for said process. The process itself will typically be best placed to recognise when any given data to which it has access in the storage unit is no longer required, for example, in the situation where the process is sequentially processing data in the storage unit in a direction from the lower region limit towards the upper region limit, once access to data stored adjacent to the lower region limit is no longer required, the process can simply increase the lower region limit so that on the one hand that no longer needed data in no longer accessible to it, but on the other hand and more significantly, that region of the storage unit can then be made available to another process for the storage data.

In order to ensure that data stored in the data storage unit is strictly isolated between processes, the protection unit may be configured to erase the data which has previously been stored in the storage unit but is no longer required. This ensures that when one process relinquishes access to a particular region of the storage unit, no data is left behind which another process could then (whether intentionally or unintentionally) access. Accordingly, in some embodiments said protection unit is configured to erase said data stored adjacent to said lower region limit when said lower region limit is increased. Thus, when a process or the protection unit increases a lower region limit, the protection unit can be configured to erase the data to which access has just been relinquished. In some embodiments said protection unit is configured to erase said data before a further upper region limit below said lower region limit is increased beyond said (previous) lower region limit. In this situation the protection unit can be configured to only perform the erasing when a upper region limit defining an access region lower in the storage unit is increased to include the portion which has been freed up by the process increasing its lower region limit. For example, when a process increases its lower region limit, the protection unit may mark the freed up portion of the storage unit as "dirty" and then only later, when the protection unit allocates at least part of that freed up region to another process, will it explicitly erase the data before further data storage by that second process can be carried out.

In some embodiments said protection unit is configured to increase said upper region limit when a process having access to said allocated access region has requested more storage than is provided by a current size of said allocated access region and a portion of said storage unit above said upper region limit is available. It may be the case that the protection unit initially allocates an access region to a process which is known not to be as large as the amount of storage ultimately required (and requested) by that process. However, rather than waiting until the full amount of storage is available, it is advantageous to provide the process with access to a smaller portion of the storage unit to begin with and then later when a portion of the storage unit above the upper region limit for that process' access region becomes available. In some embodiments, when a process having access to said allocated access region requires more storage than is provided by a current size of said allocated access region, said process is configured to poll said upper region limit stored in said protection unit to determine when additional storage is available. Only the protection unit is allowed to increase the position of the upper region limit, and therefore give the associated process access to more storage in the storage unit, so the process itself can determine when that additional storage has been granted, by polling its upper region limit to identify when the necessary update has been carried out by the protection unit.

In some embodiments each said process of said plural processes is performed with respect to a predetermined set of data, wherein data items in said predetermined set of data have dependencies on other data items in said predetermined set of data, and said data processing apparatus is configured to share execution of said process between more than one processing unit. Because data items in the predetermined set of data have dependencies on other data items in the predetermined set of data, and because processing of that predetermined set of data is carried out by more than one processing unit, it becomes necessary for the control of access to the storage unit to allow a data item initially handled by one processing unit to be later handled by another processing unit. The protection unit is of particular advantage in this situation because access regions are defined for processes and therefore two processing units known to be executing the same process can securely be given access to the same allocated access region in the storage unit.

There are a variety of different types of data processing tasks which could be shared between the more than one processing units and in which the data items being processed could have dependencies on other data items within the same set, but in some embodiments said plural processes are video processing tasks and said plural processing units are plural video cores configured to perform video processing tasks. Video processing tasks (in particular, encoding or decoding) are known to be computationally intensive tasks which lend themselves well to parallel processing on dedicated video processing cores and wherein many data dependencies between data items being processed are likely to occur.

In some embodiments said predetermined set of data is a video frame, and said data processing apparatus is configured to subdivide said frame into plural horizontal stripes and to allocate said horizontal stripes for processing amongst said plural video cores. Subdividing a video frame into horizontal stripes for allocation to different video cores for processing is of benefit when administering parallel processing of video data between multiple video cores, since horizontal stripes of a video frame can generally be processed relatively independently of one another, with the one significant exception that data dependencies between the stripes in the frame typically mean that each stripe depends in some fashion on the stripe above. The shared access by plural video cores to the same allocated access region of the storage unit is thus of benefit in allowing different video cores processing different horizontal stripes to be handed over from one core to another in order to allow those data dependencies to be resolved.

In some embodiments, a video core allocated a first horizontal stripe in said video frame is configured to request said protection unit to allocate storage space in said storage unit corresponding to a width of said video frame. The maximum amount of storage space in the storage unit which may be required by a video core processing horizontal stripes corresponds to the full width of a horizontal stripe in the video frame, since, in the worst case scenario a subsequent horizontal stripe could have data dependencies anywhere across the width of that horizontal stripe and accordingly it is beneficial if the video core allocated the first horizontal stripe in video frame requests that the protection unit allocates storage space corresponding to a width of the video frame.

In some embodiments when said protection unit has defined said allocated access region for a first video core executing a first video processing task, if a second video core is executing a second video task, said protection unit is configured to prevent association of said second video core with said allocated access region for said first video core. Accordingly, the protection unit is configured to keep track of which video cores are executing which video processing tasks and to prevent a second video core which is executing a second video task from being associated with an allocated access region for a first video core to thus maintain in a secure, hardware enforced manner the separation of access of two different video tasks to the storage unit.

In some embodiments when said protection unit has defined said allocated access region for a first video core processing said video frame, if a second video core is allocated a horizontal stripe of said video frame, said protection unit is configured to give said second video core access to said storage unit as defined by said allocated access region for said first video core. Accordingly, the protection unit is configured, rather than defining a new allocated access region of the storage unit for the second video core, to simply associate that second video core with the already defined allocated access region for the first video core. Management of the allocated access region is thus simplified and furthermore it is ensured that different video cores processing horizontal stripes of the same video frame have access to the same region of the storage unit.

In some embodiments said protection unit is configured, when defining an allocated access region of said storage unit, to set a lock in said protection unit for the associated process, said lock configured to be unset by said associated process, wherein, when said lock is set in said protection unit, another process cannot cause said protection unit to define a new allocated region of said storage unit. Accordingly the protection unit is thus configured (and this functionality is therefore protected in hardware) to prevent a second process from setting up access to a region of the storage unit whilst a first process has set the lock. Providing this lock simplifies the mechanism for associating an allocated access region with a particular core. With the lock set, only the leftmost (i.e. lowest) access region needs to be considered when a core seeks to attach itself to an existing access region, and it is guaranteed that only cores belonging to the same session can attach themselves to that existing access region.

In some embodiments said data processing apparatus is a video processor and said plural processes correspond to more than one video stream. The isolation that the present technique provides between in the different processes may be of particular advantage in the context of a video processor processing multiple video streams, since it may be desirable for those video streams, despite being processed on the same video processor, to be kept fully independent of one another.

In some embodiments said plural processes are associated with at least two different security contexts, wherein data associated with a first security context must not be accessible to a process associated with a second security context. The approach of the present technique is of particular benefit when at least two different security contexts are present, because of the isolation between those security contexts that is supported.

In some embodiments said data processing apparatus is configured to reset a processing unit of said plural processing units before that processing unit begins execution of a new process. This provides a further level of isolation between different processes being executed by the data processing apparatus by ensuring that no data or state from a first process remains in a processing unit before it begins execution of the new process.

The data processing apparatus may take a number of forms, but in some embodiments said data processing apparatus is embodied as an on-chip device and said storage unit is an on-chip storage device. Storage space in such an on-chip storage device is typically at a premium and the present techniques, which allow particularly efficient, yet secure, sharing of such an on-chip storage device are therefore of benefit.

The on-chip storage device may be an SRAM device.

Viewed from a second aspect the present invention provides a data processing apparatus comprising:
means for executing plural processes;
means for storing data required for said plural processes; and
means for controlling access to said means for storing data, wherein said means for controlling access is configured to define an allocated access region of said means for storing data for each process of said plural processes, wherein said means for controlling access is configured to deny access for each said process outside said allocated access region and wherein allocated access regions are defined to be non-overlapping,
wherein said means for controlling access is configured to define each said allocated access region as a contiguous portion of said means for storing data between a lower region limit and an upper region limit,
and wherein said means for controlling access is configured such that when said lower region limit is modified said lower region limit cannot be decreased and such that when said upper region limit is modified said upper region limit cannot be decreased.

Viewed from a third aspect the present invention provides a method of data processing comprising the steps of:
executing plural processes on plural processing units;
storing data required for said plural processes in a storage unit;
controlling access to said storage unit by defining an allocated access region of said storage unit for each process of said plural processes, wherein access for each said process outside said allocated access region is denied and allocated access regions are defined to be non-overlapping;
defining each said allocated access region as a contiguous portion of said storage unit between a lower region limit and an upper region limit; and
when said lower region limit is modified preventing said lower region limit from being decreased and when said upper region limit is modified preventing said upper region limit from being decreased.

The above, and other objects, features and advantages of this invention will be apparent from the following detailed description of illustrative embodiments which is to be read in connection with the accompanying drawings.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1A:
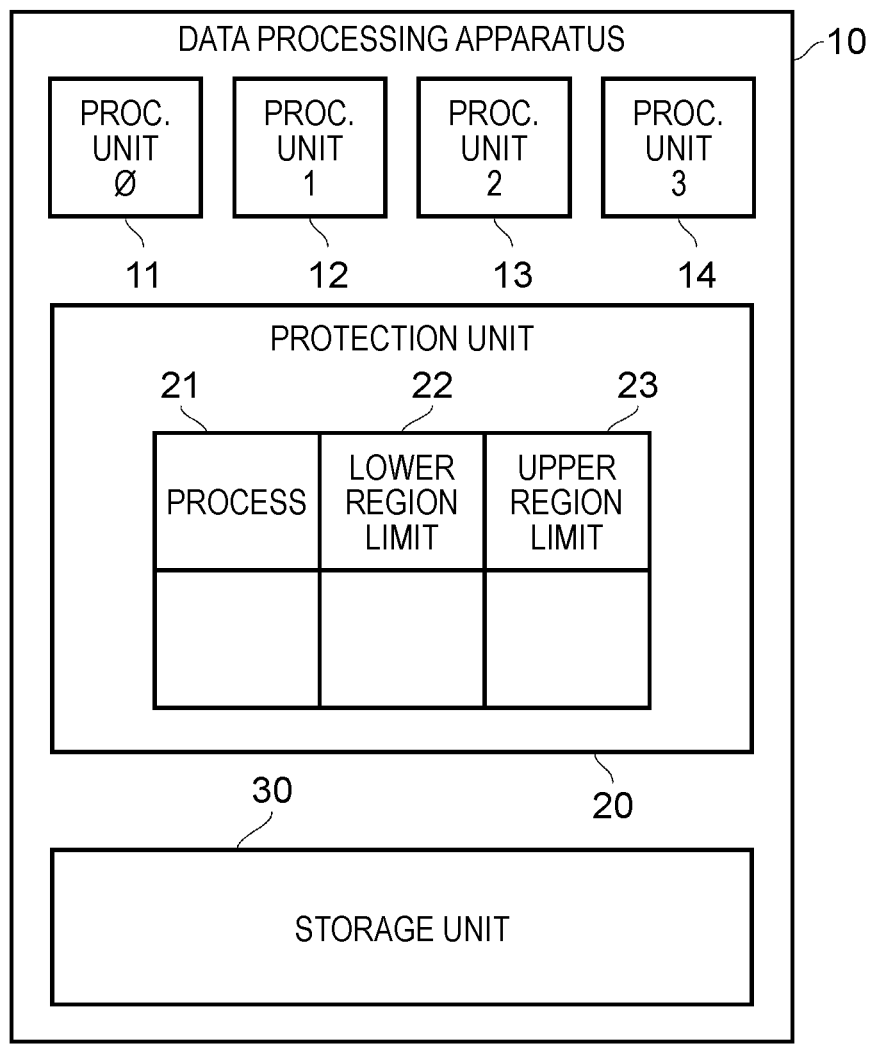
FIG. 1A schematically illustrates a data processing apparatus having four processing units, a protection unit and a storage unit in one embodiment.

FIG. 1A schematically illustrates a data processing apparatus 10 in one embodiment. This data processing apparatus 10 comprises four processing units 11, 12, 13, 14 which are configured to perform data processing operations. These data processing operations are carried out with respect to data which is temporally stored in storage unit 30. Each processing unit does not have direct access to the storage unit 30, but must do so via protection unit 20. The protection unit 20 is configured to define access regions in the storage unit 30, these access regions being bounded by a lower region limit 22 and an upper region limit 23. The protection unit 20 administers these access regions on a per process basis. The data processing apparatus 10 is configured to execute various processes and in particular is configured to be able to execute more than one process concurrently. Executing processes are distributed between the multiple processing units 11, 12, 13, 14 to benefit from the parallelism that this brings. Hence, for example a first process could be executed by processing units 11 and 12, whilst a second process could be executed by processing units 13 and 14. Thus, protection unit 20 maintains an association between a given process 21, and a lower region limit 22 and an upper region limit 23. This information defines the access rights such that a processing unit executing that process can only access the storage unit 30 at locations between the lower region limit and the upper region limit. Furthermore, the protection unit 20 is configured such that the lower region limit 22 and upper region limit 23 which it stores can only be increased when modified. Accordingly, an access region defined for a given process by the protection unit 20 corresponds to a sliding window within the storage unit 30 to which processing unit executing that process can have access. As such, an access region can grow from an initial minimum configuration in which both the lower region limit and the upper region limit correspond to the lowest storage location in the storage unit 30 to a maximum access configuration in which the lower region limit corresponds to the lowest storage location and the upper region limit corresponds to the highest storage location in the storage unit 30, through to a final minimum access configuration in which both the lower region limit and upper region limit correspond to the highest storage location in the storage unit 30. The protection unit 20 is configured to control access to the storage unit by more than one process and access regions for different processes are constrained to be non-overlapping. The non-overlapping nature of the two access regions ensures that different processes being executed by the processing units cannot have access to the same region of the storage unit 30 and therefore the security of one process with respect to the other is protected.

Figure 1B:
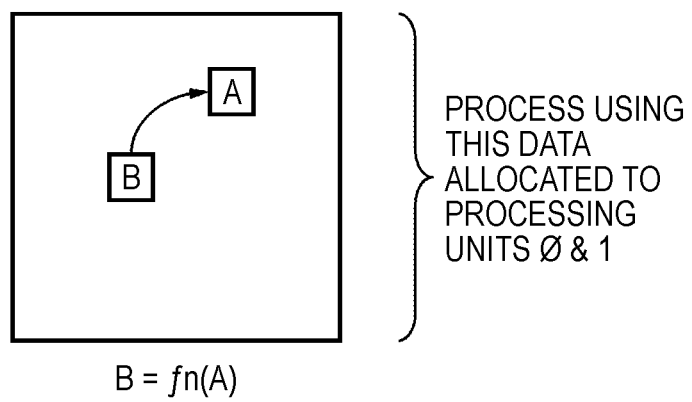
FIG. 1B schematically illustrates a block of data which is allocated to processing units 0 and 1 (in FIG. 1A), wherein a data value B therein has a dependency on a data value A therein.

The configuration of the protection unit 20 shown in FIG. 1A in which the allocation access regions are administered on the basis of processes, is of particular benefit in the context of the processing of a set of data such as that schematically illustrated in FIG. 1B. This set of data, for which the process using this data has been allocated to processing units 0 and 1 (i.e. 11 and 12 in FIG. 1A), includes dependencies between the data items within the set. For example, as illustrated in FIG. 1B, data item B depends on (i.e. is a function of) data item A. Because of this dependency, when the process is allocated to more than one processing unit, there is the need for both processing units to have access to the same region of the storage unit, such that if one processing unit handles the processing of data item A, a second processing unit handling the processing of data item B will be able to access data item A to resolve the dependency. This aspect will be explained in more detail in the following with reference to further examples.

Figure 2A:
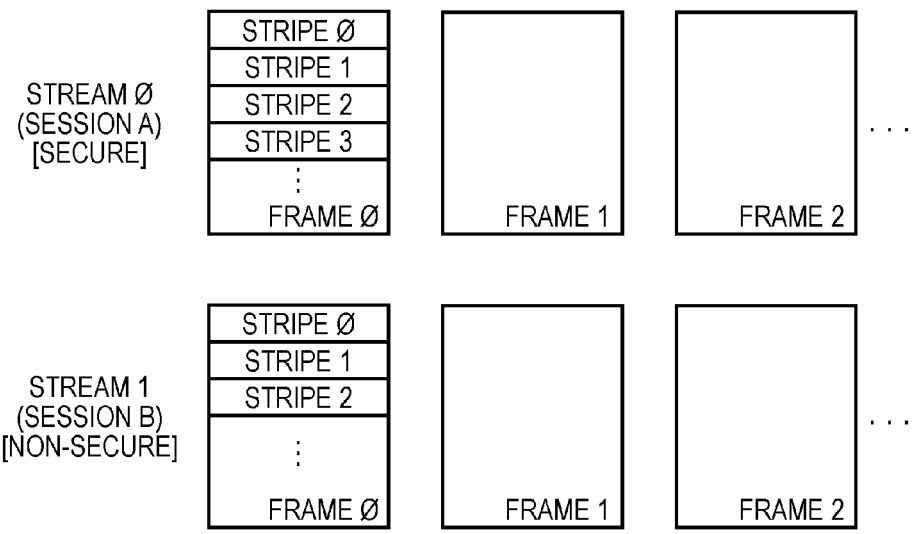
FIG. 2A schematically illustrates a first, secure, video stream and a second, non-secure, video stream in which individual frames of each video stream are subdivided into horizontal stripes for video processing.

One context in which the data processing apparatus may be used is that of video processing. FIG. 2A schematically illustrates two streams of video data which require processing. In this example the two streams of video data shown represent unencoded video data which is to be encoded by the data processing apparatus (i.e. acting as a video encoder), although the embodiments described herein are equally applicable to video decoding. A first process ("session A") is executed by the data processing apparatus to encode stream 0, whilst a second process ("session B") is concurrently executed by the data processing apparatus in order to encode stream 1. As indicated in FIG. 2A, stream 0 represents secure video data, whilst stream 1 is non-secure video data and hence there is a need to ensure that processing of the two streams, and their associated data, are kept apart from one another. It is nevertheless advantageous if the processing of both streams can be carried out by a single data processing apparatus such as that illustrated in FIG. 1A, in particular one in which the multiple processing units share access to a single storage unit 30 so that additional complexities and costs of providing multiple local storage units, or the additional bandwidth and latency associated with accessing separate storage units external to the data processing apparatus, are avoided.

Figure 2B:
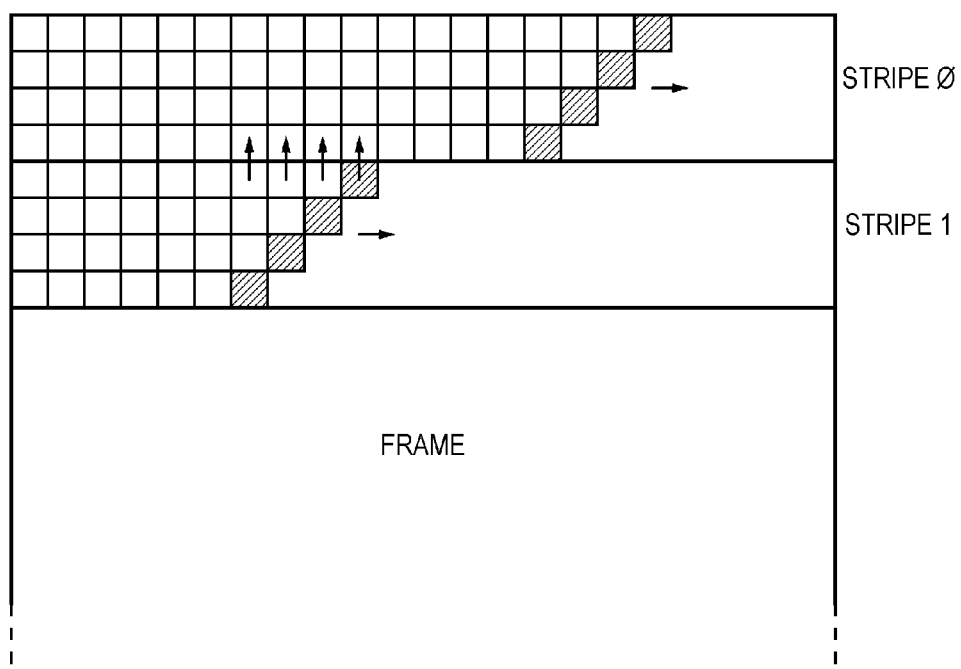
FIG. 2B schematically illustrates the processing of two adjacent horizontal stripes in a frame of video data.

The data processing apparatus is configured to perform the encoding of the video data on a frame-by-frame basis, and within a given frame on a stripe-by-stripe basis. Each frame of video data is subdivided into multiple horizontal stripes as shown in FIG. 2A. Each stripe spans a number of macroblocks, for example four macroblocks as illustrated in FIG. 2B. Because the dependencies between macroblocks are arranged to be upwards or leftwards of a given macroblock the encoding of a stripe proceeds with a staggered macroblock front as shown in FIG. 2B, wherein for each stripe the macroblocks currently being processed are shown as hatched. The dependencies between macroblocks are not necessarily confined to within a given stripe though and accordingly, the dependencies from one stripe might point to macroblocks within another stripe, as shown in FIG. 2B wherein the dependencies of some of the macroblocks currently being processed in stripe 1 are encoded with respect to stripe 0. Hence, when the encoding of a frame of video data is shared between multiple processing units, different processing units will be allocated a subset of the stripes in that frame and those processing units may need access to the same data in order to resolve dependencies. Thus in the example of FIG. 2B, the processing unit encoding stripe 0 will write the encoded stripe data to the local storage unit so that a processing unit performing the encoding of stripe 1 (probably a different processing unit) can resolve the data dependencies therein.

Figure 3:
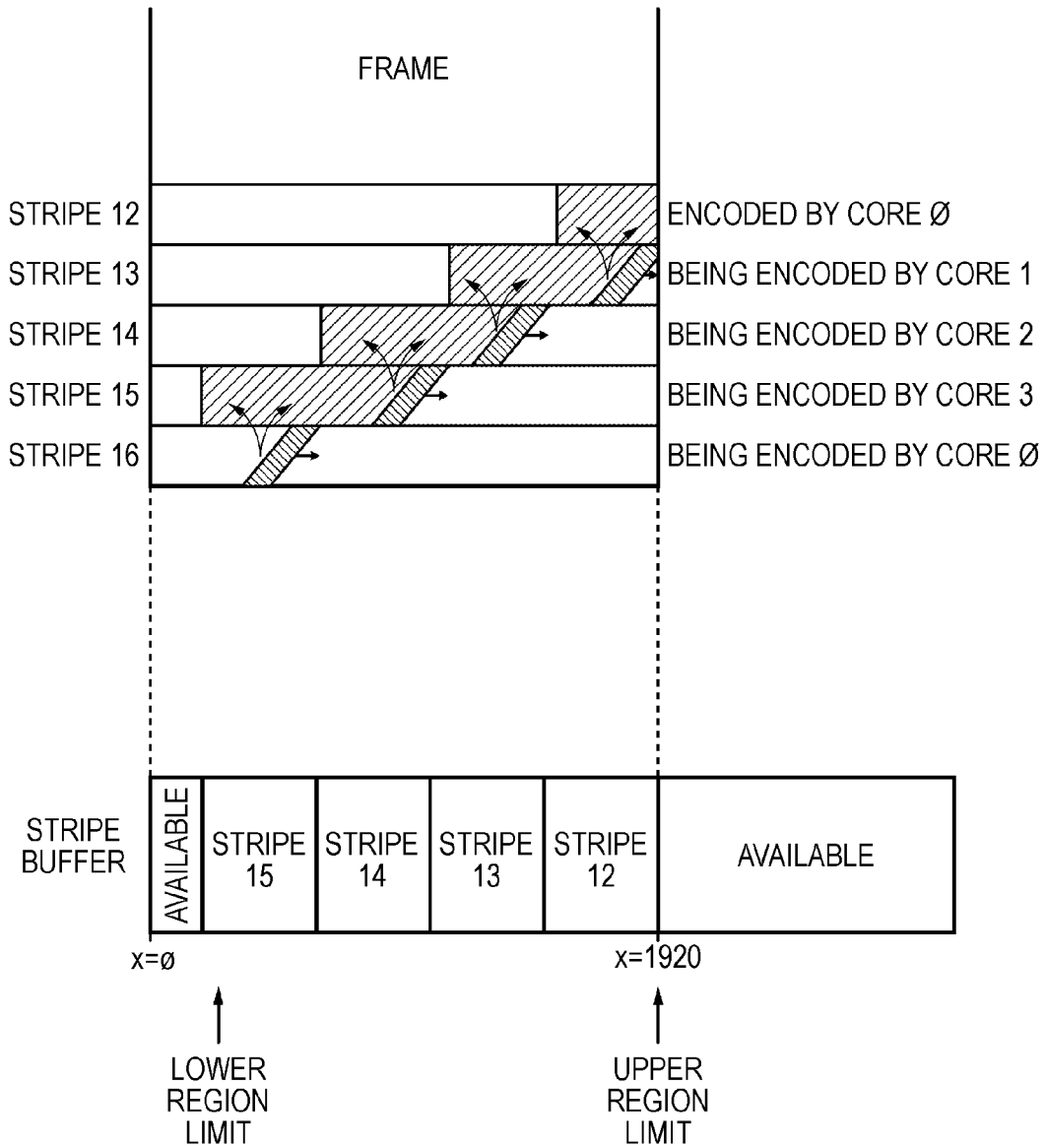
FIG. 3 schematically illustrates concurrent processing of four stripes of a frame of video data and the associated usage of the storage buffer in one embodiment.

FIG. 3 schematically illustrates the concurrent processing of four stripes of a frame of video data by four video cores. The hatched diagonal regions show the processing front in each stripe, i.e. the macroblocks currently being encoded by the relevant core. As shown in the figure, stripe 13 is being encoded by core 1, stripe 14 is being encoded by core 2, stripe 15 is being encoded by core 3 and stripe 16 is being encoded by core 0. The encoding of this frame of video data has been shared out between these four video cores by a scheduler, such that the cores begin processing the next stripe as they become available. As also shown in FIG. 3 it was core 0 which encoded stripe 12 and having completed that task began encoding stripe 16. FIG. 3 also shows same dependencies between stripes, for example showing the portion of stripe 12 to which the current encoding stripe 13 may need to make reference and so on. These portions of stripe data which are needed to resolve data dependencies are stored in the stripe buffer shown in the lower part of FIG. 3. As can be seen in the figure the width of the stripe buffer used corresponds to the width of the image in the video data frame, such that in this example where the video data being encoded is 1080p (HD) video data, the image width is 1920 and the width of the stripe buffer used corresponds to this image width (i.e. storage is provided which can accommodate such data as represents this image width). Furthermore, the interlinked nature of the encoding being performed by the four cores means that an ordered sequential usage of the stripe buffer can be made to buffer the encoded video data generated by each individual encoding process. Usage of the stripe buffer is thus always progressing from left to right i.e. from lower address (x) values to higher address (x) values.

For example, when core 1 completes the encoding of stripe 13, then stripe 12 will no longer be required and the last remaining portion of stripe 12 can be overwritten in the stripe buffer. The content of the stripe buffer therefore reflects the sections of previously encoded stripes which are currently required to resolve data dependencies in the encoding currently being performed by each core. As the encoding of the stripes progresses rightwards, the boundaries between the stripe numbers in the stripe buffer will also commensurately progress to the right. For example, as less and less of stripe 12 needs to be available, the boundary between stripe 13 and 12 in the stripe buffer will move to the right, as data at the left hand side of the section of stripe 12 illustrated in FIG. 3 can be discarded and the encoded data generated by core 1 encoding stripe 13 can be written in its place. Note however, that since all four cores are encoding stripes from the same frame, all four cores are executing the same process (i.e. the same video session). For this reason, all four cores share access to the same defined "region" of the stripe buffer, which at the instant illustrated in FIG. 3 extends from the uppermost boundary at x=1920 down to the lower side of the portion where stripe 15 is stored. The portion below stripe 15 is marked "available" as no further stripe data needs to be stored in the stripe buffer for this session. The lower boundary of the stripe buffer region allocated to this session can therefore be moved upwards as data from stripe 15 is no longer required. Note that data from stripe 16 is not stored in the stripe buffer because as this is the last stripe in the frame no further stripes depend thereon. Hence, when the frame illustrated in FIG. 3 is the last frame being processed for this session, the lower region limit will then move upwards (to the right) as data from stripe 15 is no longer required until ultimately the lower region limit meets the upper region limit at x=1920. It should be noted that although the example shown in FIG. 3 is described in terms of a video encoding process, the techniques described for the usage of the stripe buffer are equally applicable to a video decoding process.

Figure 4:
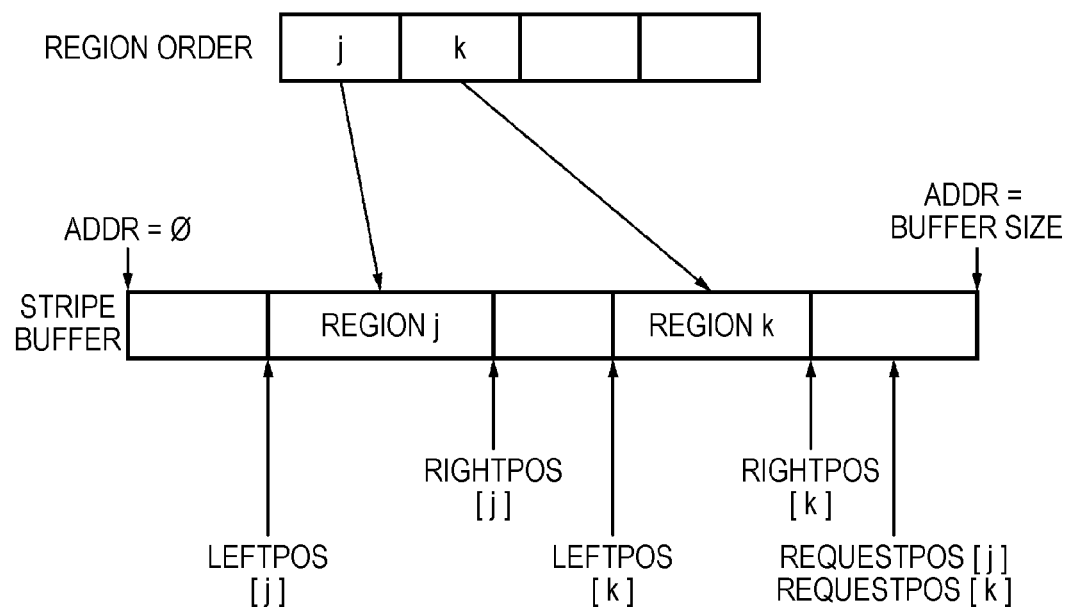
FIG. 4 schematically illustrates the definition of allocation access regions in a buffer in one embodiment.

FIG. 4 schematically illustrates how the administration of defined access regions to the stripe buffer is carried out by the protection unit in one embodiment. Two allocated access regions are shown, namely region j and region k. The buffer itself extends from an address ADDR=0 to an address ADDR=BUFFERSIZE and the portion of the buffer which may be accessed within a given region is defined by the values LEFTPOS and RIGHTPOS. The protection unit in this embodiment also maintains a register REGIONORDER by means of which the ordering of the regions may be kept track of, such that for example if a region is deleted, the remaining regions may be readily regrouped into a sequential set of regions. In addition, the protection unit also stores a value REQUESTPOS for each region, indicating the size of buffer space which the process accessing that region (i.e. the cores carrying out that process) have requested. As explained above with reference to FIGS. 2A, 2B and 3 this corresponds to the width of the image in a frame of video data being handled by that process. The protection unit is configured such that regions in the stripe buffer are non-overlapping, i.e. RIGHTPOS[j] cannot be increased to greater than LEFTPOS[k]. In addition, RIGHTPOS for any region cannot be increased to greater than REQUESTPOS for that region. The implementation of these rules in the hardware of the protection unit ensures that the isolation of the content of the two regions from one another is assured.

Figure 5:
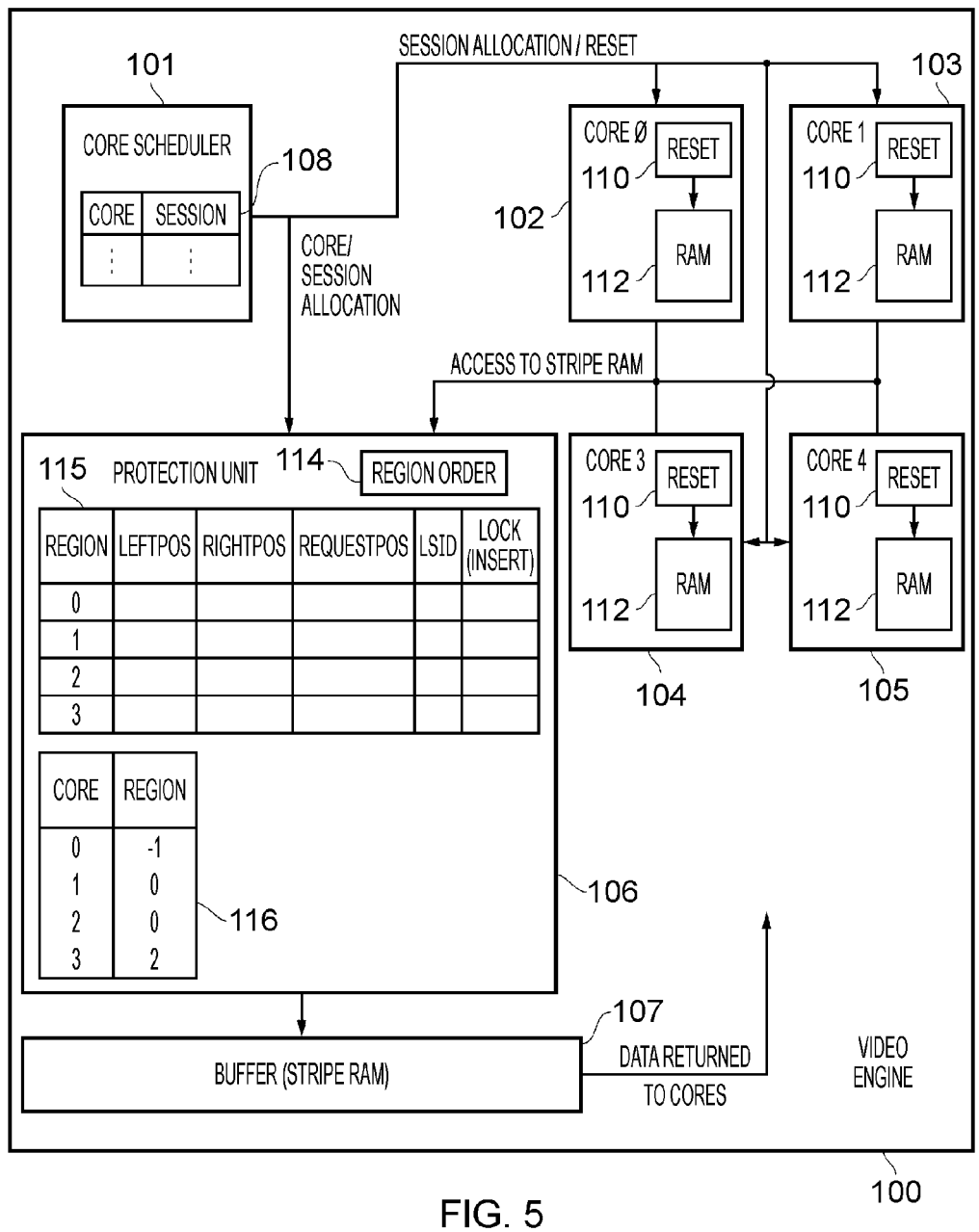
FIG. 5 schematically illustrates a video engine in one embodiment.

FIG. 5 schematically illustrates a video engine 100 in one embodiment. The video engine 100 comprises a core scheduler 101, four video cores 102, 103, 104, 105, a protection unit 106 and a buffer (stripe RAM) 107. The core scheduler 101 allocates cores to the video sessions to be handled, maintaining this information 108 as an association between core and session IDs. This information is distributed to the cores together with a reset signal, such that when a core is allocated to a new session it must reset itself before beginning execution of that session. Each core comprises reset circuitry 110 configured to carry out this reset, in particular to clear the content of the RAM 112 within each core so that no data remaining from a previous session may be accessible to a subsequent session. The session allocation information is also passed to the protection unit 106.

The protection unit 106 controls access by the four cores to the buffer 107. As described above, access to the buffer by a core is only possible within a defined region of the buffer associated with that core. The protection unit maintains a set of information 115 defining each region it administers and further maintains an association 116 between cores and regions. Hence, for each region, the protection unit 106 maintains a LEFTPOS, RIGHTPOS and REQUESTPOS value as described above to reference FIG. 4. In addition the protection unit stores a session identifier value LSID indicating the session associated with that region. This, in combination with the core/region information 116, is derived from the core/session information 108 received from the core scheduler 101. Further, for each region, the protection unit 106 maintains a value INSERT which, as will be described below, acts as a locking mechanism. The values stored in the core/region information 116 can also indicate if a core is not currently associated with a region (e.g. as illustrated core 0 is not associated with a region, having a value −1). Also, more than one core can be associated with a given region (since a region is associated with a session and more than one core can execute a session) e.g. region 0 in the illustrated example is shared by cores 1 and 2. Region 2 in the illustrated example is allocated to core 3. Accordingly, currently regions 1 and 3 are not allocated to cores. Note that although schematically illustrated as two tables in FIG. 5 for legibility, the information 115 and 116 are typically implemented as the content of registers within protection unit 106.

Figure 6A:
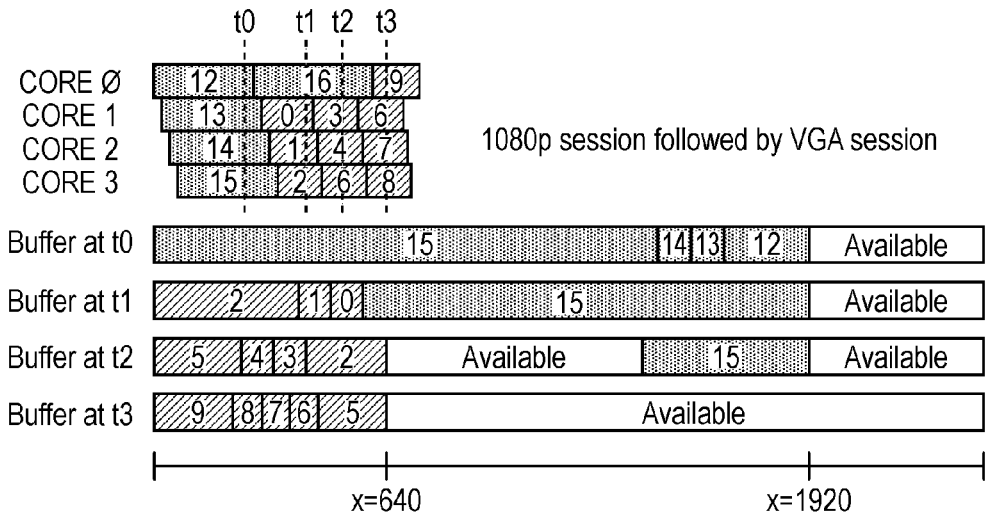
FIG. 6A schematically illustrates the evolving content of a stripe buffer in one embodiment when a 1080p session is followed by a VGA session.
Figure 6B:
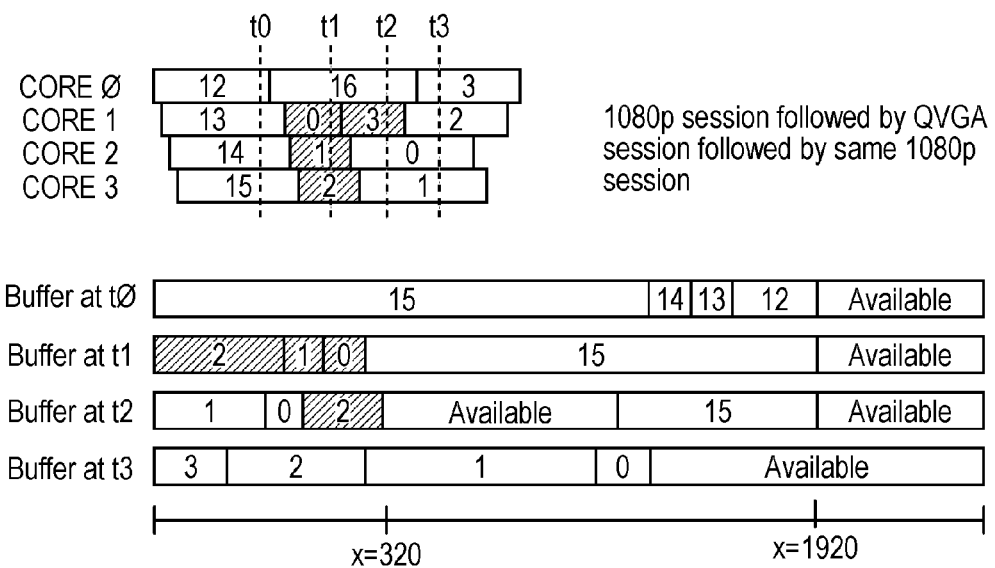
FIG. 6B schematically illustrates the content evolution of a stripe buffer in one embodiment in which a 1080p session is followed by a QVGA session followed by the same 1080p session.

FIGS. 6A and 6B schematically illustrate the time evolution of the stripe buffer content as administered by the protection unit when the cores are handling two different sessions which need to be isolated from one another. In FIG. 6A a 1080p (HD) session is followed by a VGA session, whilst in FIG. 6B a 1080p (HD) session is followed by a QVGA session followed by the same 1080p (HD) session again. In FIG. 6A, at time t0 the four cores handling the video processing are getting towards the end of a frame of video data, with only the last stripe 16 unstarted. The width of the image in the 1080p session is 1920 pixels and accordingly the size of the buffer used by this session matches this, with the smaller part of the buffer above this point remaining available throughout.

The 1080p session is followed by a VGA session (having an image width of 640 pixels). Hence at time t1 when cores 1, 2 and 3 have moved on to processing for the VGA session, whilst core 0 is still processing the last stripe of the 1080p session, the buffer contains data relating to both sessions. However, at this point a full image width (640 pixels) space corresponding to that is not available in the buffer for the VGA session, because the 1080p session is still occupying too much of the buffer. Specifically, core 0 processing stripe 16 needs reference to stripe 15 stored in the buffer at a position which corresponds to lower than the maximum image width for the VGA session. However, by time t2, the processing of stripe 16 by core 0 has progressed to a point where only the last, righthand-most portion of stripe 15 is still required in the buffer and the data left of this in the stripe (lower in the buffer) has been erased, making that portion of the buffer available. Further, note that the VGA session has not extended above x=640, since this represents the full image width of the VGA session and more buffer space than this is not required. Accordingly, the erased, available space in the buffer between the regions associated with each session then continues to grow to the right, until by the time t3, when all four cores are handling the VGA session, no video data is being held for the 1080p session anymore and all space in the buffer above x=640 is erased and available.

FIG. 6B schematically illustrates a similar situation where the same 1080p session is this time followed by a QVGA session (maximum image width x=320) and is then followed by the same 1080p session again. The situation at time t0 is the same as that illustrated in FIG. 6A. At time t1, the situation is essentially the same as that in FIG. 6A, with the exception that the QVGA session only occupies space in the buffer corresponding to a smaller image width of 320 pixels. Indeed, as was the case in FIG. 6A, at time t1 in FIG. 6B the QVGA session is not quite occupying a space in the buffer corresponding to the full image width (x=320) since data from stripe 15 in the 1080p session is still occupying the buffer to a point slightly below x=320. However, by time t2 the lower extent of the stripe 15 data from the 1080p session has moved upwards allowing the QVGA session to occupy up to its full image width of x=320. A more significant difference with respect to FIG. 6A that can be seen in the small scheduling diagram of FIG. 6B is that at time t2 cores 2 and 3 have already reverted to processing for the 1080p session and accordingly at time t2 the lowest portion of the buffer is now occupied by video data for stripe 0 and stripe 1 of the next frame of the 1080p session. As the processing continues between t2 and t3 the last of the data from stripe 2 of the QVGA session stored in the buffer is used and the lower limit of the region to which the cores executing processing for the QVGA session moves up to finally meet the upper limit at x=320 at which point this region effectively no longer exists and the protection unit can redefine it for use in association with another core session. This then allows the 1080p session which follows the QVGA session to continue the extension of its access region in the buffer to the right (to higher x values). As can be seen at time t3 only the latter 1080p session is using the buffer, although at this early stage the cores are processing the first four stripes in a frame for this session and the full 1080p image width of the buffer has not yet been occupied.

Figure 7:
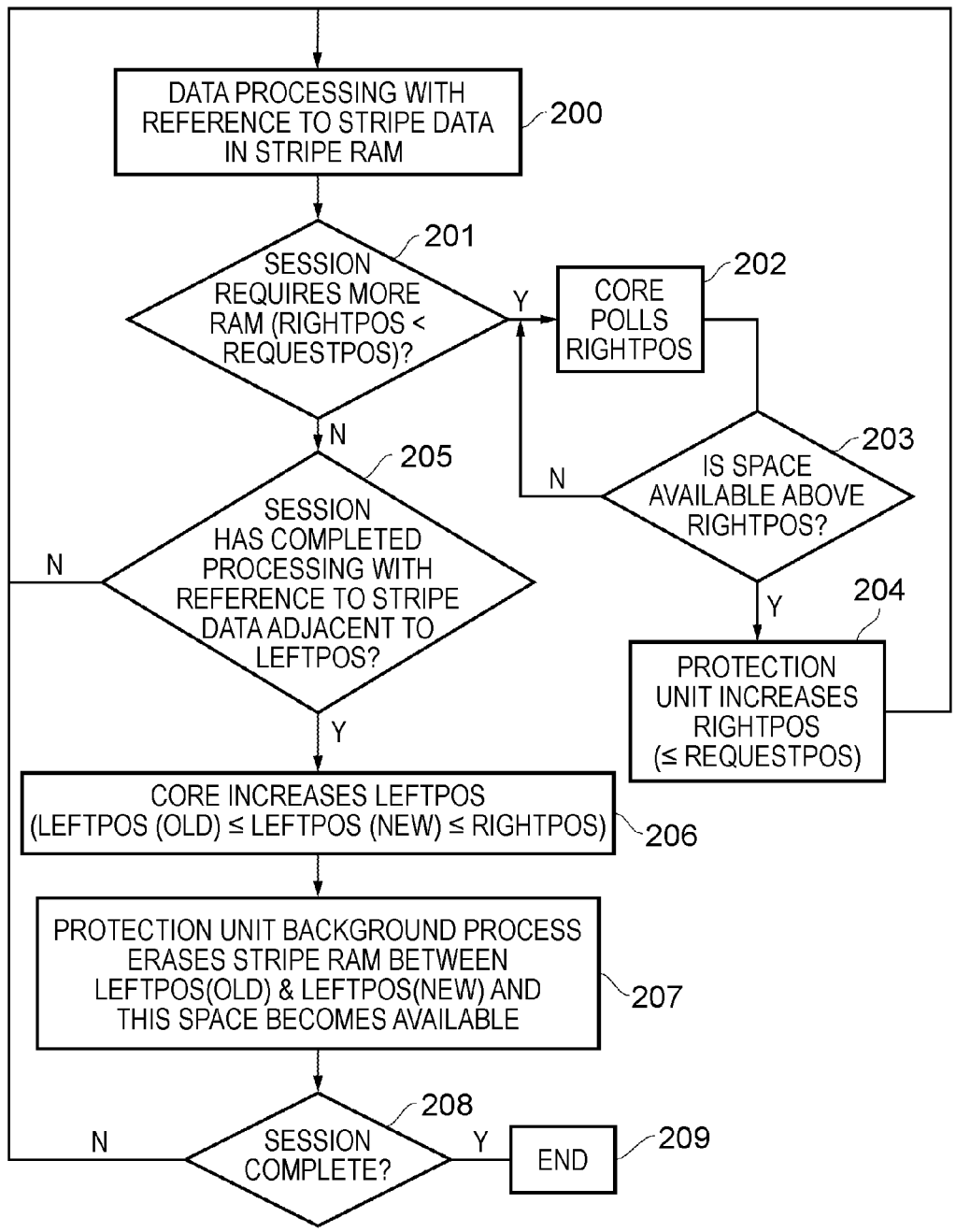
FIG. 7 schematically illustrates a series of steps which are taken in one embodiment to update the definition of an allocated access region of a storage buffer in one embodiment.

FIG. 7 schematically illustrates a series of steps which are taken in one embodiment in a video engine such as that illustrated in FIG. 5. The flow can be considered to begin at step 200 where data processing is being carried out by the video cores with reference to stripe data stored in the stripe RAM. At step 201, it is determined if a session requires more RAM i.e. if there is a session for which the associated region has a RIGHTPOS value which is less than the REQUESTPOS value specified when this session began. This is for example the situation at time t1 in the situation illustrated in FIG. 6A where the VGA session still requires the use of more of the stripe RAM but it has not yet become available due to the continuing occupation of the space above by the last stripe of the 1080p session. When this is the case, the flow proceeds to step 202 where the core requiring the additional space polls its RIGHTPOS value in the protection unit to determine when this extra space has become available. Returning to the example of FIG. 6A, at time t1, this would be core 1, being the core handling stripe 0 of the VGA session. At step 203 it is determined (by the protection unit) if further space is available above RIGHTPOS for this session. Hence, at time t1 in the example of FIG. 6A this question would be answered in the negative and the flow would then return to step 202 for the core to continue polling RIGHTPOS to determine when the space has become available. Once the protection unit determines that more space is available above RIGHTPOS then the flow proceeds to step 204 where the protection unit increases RIGHTPOS to make use of the available space. RIGHTPOS is only increased up to a maximum of the REQUESTPOS value for this session. Thus, in the example of FIG. 6A at a time between t1 and t2 the protection unit has increased RIGHTPOS for the VGA session up to the maximum i.e. to x=640. The flow then returns to step 200.

Alternatively, if at step 201 a session does not require more RAM then the flow proceeds to step 205 where it is determined if a session has completed processing with reference to stripe data adjacent to LEFTPOS. This determination is carried out by the core carrying out the processing with reference to that stripe data and if such processing has completed then at step 206 that core increases the value of LEFTPOS stored in the protection unit. Note that whilst (at step 204) only the protection unit can increase the RIGHTPOS value, a core executing processing for a session is allowed to modify the LEFTPOS value stored for the region allocated to that session. Increasing LEFTPOS only reduces the region of the buffer to which the session has access and therefore does not represent a security risk. Further, as shown in FIG. 7 at step 206, the protection unit is configured to constrain modification of LEFTPOS such that the new value of LEFTPOS must not be smaller than the old value of LEFTPOS and must not be greater than the value of RIGHTPOS. Once the LEFTPOS value has been increased in this fashion then at step 207 then the protection unit erases the stripe RAM between the old and new value of LEFTPOS and this space becomes available for further allocation. In one embodiment this erasing is carried out as a background process. This background process may be configured to take place essentially as soon as LEFTPOS is increased, or may be allowed to wait until a later moment, for example when the protection unit is idle. Either way, only marking this region as available once the data has been erased ensures that (see step 203) a RIGHTPOS value defining a region lower in the buffer cannot be increased to incorporate this space until the data has been erased. Returning to step 205, if the session has not completed processing with reference to stripe data adjacent to LEFTPOS then the flow returns to step 200. Finally, at step 208 it is determined if the session is complete and if it is not then the flow returns to step 200. Once the session is complete then the flow of FIG. 7 can be considered to end at step 209.

Figure 8:
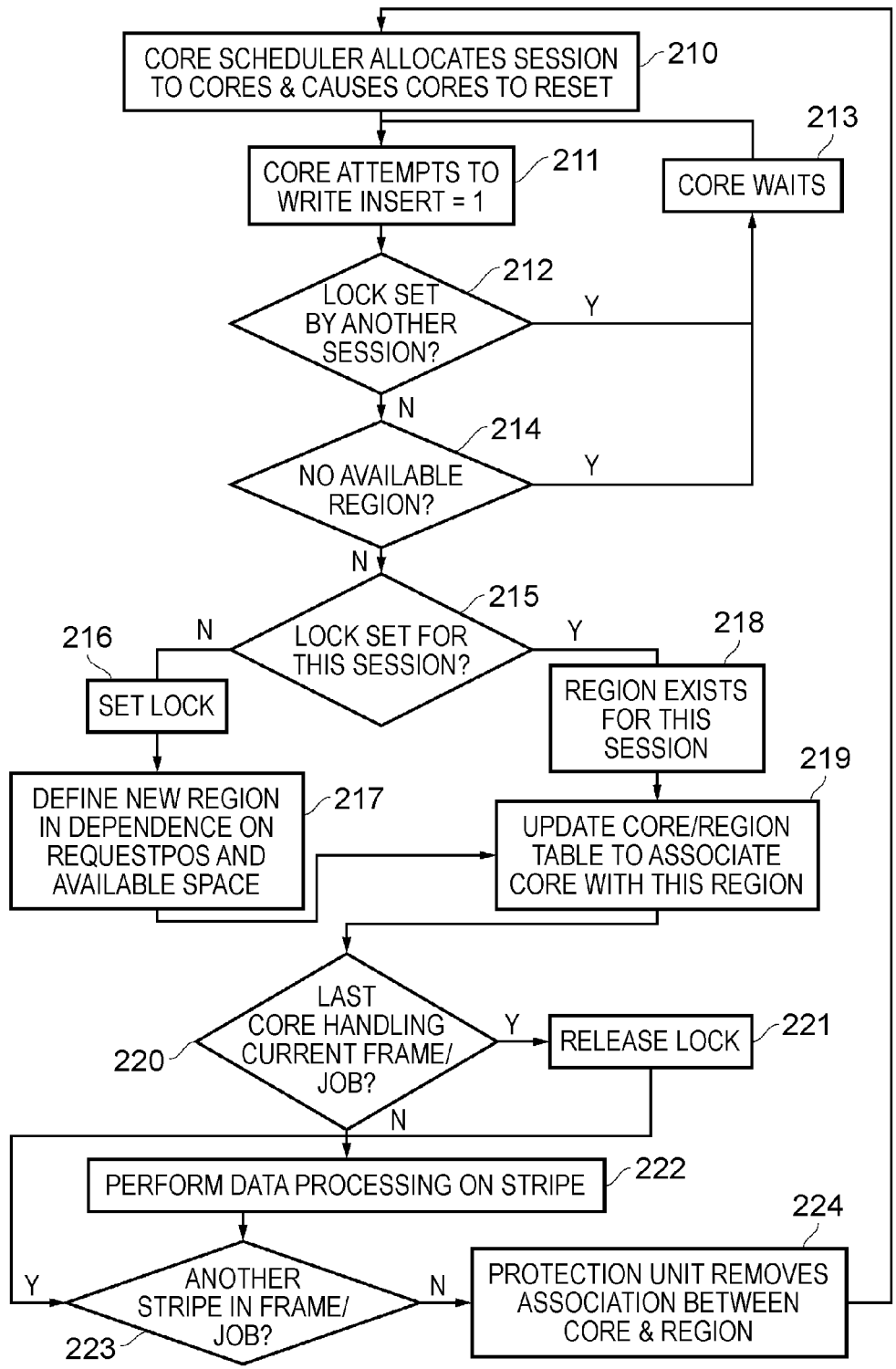
FIG. 8 schematically illustrates a series of steps which are taken in one embodiment when defining a new allocated access region for a storage unit, and subsequently carrying out data processing.

FIG. 8 schematically illustrates another sequence of steps which may be taken in a video engine such as that illustrated in FIG. 5. At step 210 the core scheduler allocates a session to the cores and causes the cores to reset. To begin processing for the session a first core of those to which the session has been allocated attempts at step 211 to write a value of 1 to its allocated entry of the INSERT register in the protection unit. Then at step 212 it is determined if this lock has already been set by another session, i.e. if INSERT has already been set to 1 for another session. If it is then the flow returns via step 213 to step 211 and the core waits and continues to test if the lock is still set by another session. Then, once the lock is no longer set for another session, at step 214 it is determined if there is an available region, since in the example embodiment shown in FIG. 5, the protection unit has the ability to define up to four regions. If none of these are currently available then the flow also returns to step 211 via step 213. However if there is an available region then it is determined at step 215 if the lock is already set for this session. If the lock is also not set for this session (i.e. if no session currently has the lock set) then at step 216 the lock is set for this session and a step 217 a new region is defined in dependence on the REQUESTPOS value which this core (this core in the first core to begin execution of this session and therefore handling the first stripe in the video frame of this session) has passed to the protection unit to request allocation of storage space in the stripe RAM corresponding to the width of the image data in the video frame for this session. At step 217 the protection unit defines the new region, setting RIGHTPOS as high as it can in dependence on the available space in the buffer. Finally at step 219, the protection unit updates the core/region table 116 to associate this core with this region.

Returning to step 215, if it is found that the lock is already set for this session, then a region already exists for this session (step 218) and the flow proceeds to step 219 where the core/region table is directly updated to associate this core with this (existing) region. In other words, where a region already exists for this session, and a further core seeks to insert a region for the same session, the protection unit is configured to attach that latter core to the already existing region for the same session. Next at step 220 it is determined if this is the last core handling the current frame or job. If this is the last core handling this frame or job, then the requirement to prevent other sessions from setting up new access regions in the stripe buffer can be relaxed and the flow proceeds via step 221 where the lock is released, i.e. the value 1 stored in the corresponding INSERT register entry is cleared. At step 222 data processing is performed on the current stripe (as for example described by the steps of FIG. 7) and at step 223 it is determined if there is another stripe in the frame/job to be processed, with the flow looping back to step 222 whilst this is still true. Once all stripes have been finished then at step 224 the protection unit removes the association between the core and the region (table 116 in FIG. 5) and the flow returns to step 210.

Figure 9:
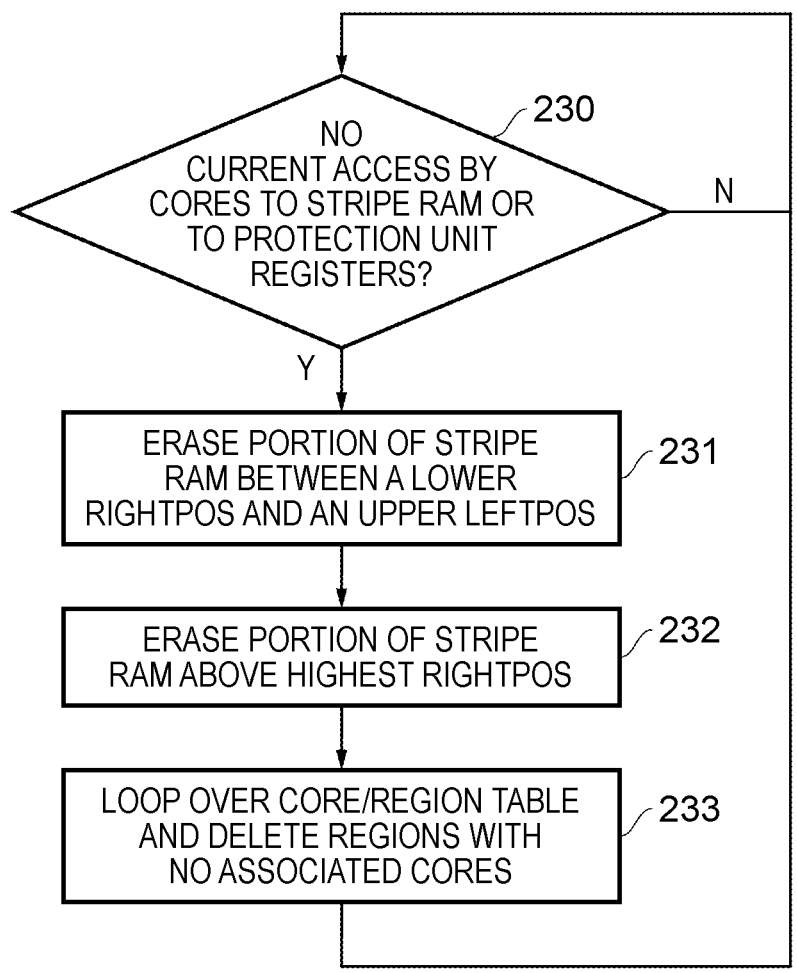
FIG. 9 schematically illustrates a series of steps which may be carried out in one embodiment in a background process carried out by a protection unit.

FIG. 9 schematically illustrates a series of steps which represent some background activity of the protection unit. At step 230 it is determined if there is no current access by the cores to the stripe RAM or to the protection unit registers. Until this is true the flow loops on itself at step 230 (i.e. this background process cannot start until the protection unit is available). Once this is true the flow proceeds to step 231 where the protection unit examines the current region definition information and erases a portion of the stripe RAM between a lower RIGHTPOS and an upper LEFTPOS value, i.e. sections of the stripe RAM between regions are identified and erased. Also, at step 232, the protection unit erases a portion of the stripe RAM above the highest RIGHTPOS value. Finally at step 233 the protection unit loops over the core/region table and deletes regions with no associated cores. Hence in the example information shown in the core region table 116 in FIG. 5, where regions 1 and 3 do not have an associated core, these regions in the table 115 would be deleted at step 233. The flow then returns to step 230. Note that steps 231, 232 and 233 in FIG. 9 are described sequentially but there is no need for any particular ordering of these steps, nor are any of these steps dependent on each other and may therefore be carried out individually, in parallel, or in any order as required by current circumstance and as possible in accordance with the availability of the protection unit.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
plural data processors configured to execute plural processes;
a memory configured to store data required for said plural processes; and
a protection circuitry configured to control access by said plural processes to said memory, wherein said protection circuitry is configured to define an allocated access region of said memory for each process of said plural processes, wherein said protection circuitry is configured to deny access for each said process outside said allocated access region and wherein allocated access regions are defined to be non-overlapping,
wherein said protection circuitry is configured to define each said allocated access region as a contiguous portion of said memory between a lower region limit and an upper region limit,
and wherein said protection circuitry is configured to prevent said lower region limit from being decreased when said lower region limit is modified, and to prevent said upper region limit from being decreased when said upper region limit is modified.

2. The data processing apparatus as claimed in claim 1, wherein said protection circuitry is configured to allow a process of said plural processes to increase said lower region limit.

3. The data processing apparatus as claimed in claim 2, wherein said process is configured to increase said lower region limit when data stored adjacent to said lower region limit is no longer required for said process.

4. The data processing apparatus as claimed in claim 3, wherein said protection circuitry is configured to erase said data stored adjacent to said lower region limit when said lower region limit is increased.

5. The data processing apparatus as claimed in claim 3, wherein said protection circuitry is configured to erase said data before a further upper region limit below said lower region limit is increased beyond said lower region limit.

6. The data processing apparatus as claimed in claim 1, wherein said protection circuitry is configured to increase said upper region limit when a process having access to said allocated access region has requested more storage than is provided by a current size of said allocated access region and a portion of said memory above said upper region limit is available.

7. The data processing apparatus as claimed in claim 1, wherein when a process having access to said allocated access region requires more storage than is provided by a current size of said allocated access region, said process is configured to poll said upper region limit stored in said protection circuitry to determine when additional storage is available.

8. The data processing apparatus as claimed in claim 1, wherein each said process of said plural processes is performed with respect to a predetermined set of data, wherein data items in said predetermined set of data have dependencies on other data items in said predetermined set of data, and said data processing apparatus is configured to share execution of said process between more than one data processor.

9. The data processing apparatus as claimed in claim 8, wherein said plural processes are video processing tasks and said plural data processors are plural video cores configured to perform video processing tasks.

10. The data processing apparatus as claimed in claim 9, wherein said predetermined set of data is a video frame, and said data processing apparatus is configured to subdivide said frame into plural horizontal stripes and to allocate said horizontal stripes for processing amongst said plural video cores.

11. The data processing apparatus as claimed in claim 10, wherein a video core allocated a first horizontal stripe in said video frame is configured to request said protection circuitry to allocate storage space in said memory corresponding to a width of said video frame.

12. The data processing apparatus as claimed in claim 9, wherein when said protection circuitry has defined said allocated access region for a first video core executing a first video processing task, if a second video core is executing a second video task, said protection circuitry is configured to prevent association of said second video core with said allocated access region for said first video core.

13. The data processing apparatus as claimed in claim 10, wherein when said protection circuitry has defined said allocated access region for a first video core processing said video frame, if a second video core is allocated a horizontal stripe of said video frame, said protection circuitry is configured to give said second video core access to said memory as defined by said allocated access region for said first video core.

14. The data processing apparatus as claimed in claim 9, wherein said protection circuitry is configured, when defining an allocated access region of said memory, to set a lock in said protection circuitry for the associated process, said lock configured to be unset by said associated process,
wherein, when said lock is set in said protection circuitry, another process cannot cause said protection circuitry to define a new allocated region of said memory.

15. The data processing apparatus as claimed in claim 1, wherein said data processing apparatus is a video processor and said plural processes correspond to more than one video stream.

16. The data processing apparatus as claimed in claim 1, wherein said plural processes are associated with at least two different security contexts, wherein data associated with a first security context must not be accessible to a process associated with a second security context.

17. The data processing apparatus as claimed in claim 1, wherein said data processing apparatus is configured to reset a data processor of said plural data processors before that data processor begins execution of a new process.

18. The data processing apparatus as claimed in claim 1, wherein said data processing apparatus is embodied as an on-chip device and said memory is an on-chip storage device.

19. The data processing apparatus as claimed in claim 18, wherein said on-chip storage device is an SRAM device.

20. A data processing apparatus comprising:
means for executing plural processes;
means for storing data required for said plural processes; and
means for controlling access to said means for storing data, wherein said means for controlling access is configured to define an allocated access region of said means for storing data for each process of said plural processes, wherein said means for controlling access is configured to deny access for each said process outside said allocated access region and wherein allocated access regions are defined to be non-overlapping,
wherein said means for controlling access is configured to define each said allocated access region as a contiguous portion of said means for storing data between a lower region limit and an upper region limit,
and wherein said means for controlling access is configured to prevent said lower region limit from being decreased when said lower region limit is modified, and to prevent said upper region limit from being decreased when said upper region limit is modified.

21. A method of data processing comprising the steps of:
executing plural processes on plural data processors;
storing data required for said plural processes in a memory;
controlling, by protection circuitry, access to said memory by defining an allocated access region of said memory for each process of said plural processes, wherein access for each said process outside said allocated access region is denied and allocated access regions are defined to be non-overlapping;
defining each said allocated access region as a contiguous portion of said memory between a lower region limit and an upper region limit; and
when said lower region limit is modified, said protection circuitry preventing said lower region limit from being decreased and when said upper region limit is modified, said protection circuitry preventing said upper region limit from being decreased.

* * * * *